UNITED STATES PATENT OFFICE.

HERMANN SCHIERLOH, OF JERSEY CITY, NEW JERSEY.

IMPROVEMENT IN THE MANUFACTURE OF COMPOUNDS FOR WELDING IRON AND STEEL.

Specification forming part of Letters Patent No. 147,576, dated February 17, 1874; application filed February 10, 1874.

*To all whom it may concern:*

Be it known that I, HERMANN SCHIERLOH, of Jersey City, in the county of Hudson and State of New Jersey, have invented certain new and useful Improvements in Manufacture of Compounds for Welding Iron and Steel; and I do hereby declare the following to be a full, clear, and exact description of the invention, such as will enable others skilled in the art to which it pertains to make and use it.

This invention is an improvement on that described in Patent No. 142,939, dated September 9, 1873; and consists in employing finely-ground iron, or iron in fine powder, instead of iron filings, as an ingredient for welding iron to steel, or steel with steel, or iron with iron.

In carrying out the process described in the patent above named, it is found that the filings should be of about the fineness produced by filing wrought-iron with a fourteen-inch file. But the production of such filings by means of a file is slow and expensive, so as to render the invention of comparatively little utility. Now, I have discovered that wrought-iron turnings may be ground in a steel mill to the fineness required, and by this method they may be produced in any quantity at a cheap rate, so as to render the invention highly useful.

In carrying out my invention, I take clean wrought-iron turnings or chips from a machine-shop, and grind them in a steel drug-mill, or any equivalent grinding-mill, so as to be of about the fineness of wrought-iron filings made by a fourteen-inch file. With this ground iron I combine borax, in the manner described in Patent No. 142,939, or in any equivalent manner which will produce the same result. The iron powder and borax answer every purpose in uniting iron with steel, or steel with steel, or iron with iron, the invention being applicable to cast, wrought, and malleable iron, and to common and Bessemer steel. But, if desired, other chemicals, such as already known for welding, may be added. As, however, I do not deem them important, I will not describe them. Besides, any skillful mechanic can apply them, if desired, by using them in the way that I use the borax.

I put up the compound in packages for use; or the ground iron and the borax may be put up in separate packages. It is best, however, to combine them ready for use.

I am aware that iron has been ground to a fine powder or flour for use in medicine; but such powder does not answer the purpose of my invention, as it will not produce a welding compound.

What I claim, and desire to secure by Letters Patent, is—

1. The new manufacture herein described, a welding-powder composed of ground iron and borax, or its equivalent, substantially as and for the purpose set forth.

2. Ground iron made by grinding wrought-iron turnings or chips in a steel or other mill, to about the fineness herein described, so as to be suitable for the manufacture of a welding compound, as set forth.

In testimony that I claim the foregoing I have hereunto set my hand this 10th day of February, 1874.

HERMANN SCHIERLOH.

Witnesses:
 THOMAS C. CONNOLLY,
 S. S. FAHNESTOCK.